Patented Jan. 23, 1951

2,539,160

UNITED STATES PATENT OFFICE 2,539,160

FOOD FLAVOR INTENSIFIERS

Walt Phillips, North Arlington, N. J.

No Drawing. Application January 28, 1950,
Serial No. 141,160

4 Claims. (Cl. 99—140)

This invention relates to an improved compound for intensifying and boosting the existing flavors of foods and beverages.

An object of the present invention is to provide a non-toxic agent for intensifying and boosting the existing flavors of foods, solid or liquid, and beverages, including flavoring extracts, condiments and edibles of all kinds.

Another object is to provide a flavor-enhancing agent which brings out the natural flavor of the food or beverage more strongly than has been possible heretofore.

The flavoring agent of the present invention differs essentially from flavoring extracts commonly used, such as vanilla extract, which add their distinctive flavors to the food or beverage. The new flavoring agent increases the strength of the natural existing flavor of the food or beverage, without otherwise affecting the flavor appreciably.

A flavor intensifier or booster made according to the present invention comprises a solution of solid extract of gentian and ascorbic acid. Any other form of gentian may be used such as powdered gentian, infusion or tincture of gentian. The proportion of the gentian extract may vary, depending on the desired strength of the intensifier. The solid extract of gentian is dissolved, preferably with ascorbic acid, in a solvent or solvents non-toxic or harmless in human consumption, such as propylene glycol or other glycols, ethyl alcohol and water, or mixtures of these. The solution is then added dropwise to foods and edibles to increase their existing flavor, the amount of the additive depending on the strength of solution prepared and the amount of food or beverage treated. The resulting flavor improvement is permanent, and the color of the food or beverage remains unchanged. The new agent not only enhances the flavor of the food or beverage but also increases its digestibility and vitamin content.

The following is an example of one specific embodiment of the invention:

Example

Four grams of solid extract of gentian and 100 mg. of ascorbic acid are mixed with sufficient solvent, such as propylene glycol or diluted alcohol to make 50 grams of the product. A drop of this solution added to 6-8 ounces, or more in some cases, of the food or beverage boosts its flavor.

If desired, common flavoring agents, such as fruit or vegetable extracts or oils, salt, spices, etc., may be added to the flavor booster of my invention.

I claim:

1. A composition for intensifying the flavor of foods and beverages, which consists essentially of a non-toxic solution having as the solvent a lower aliphatic alcohol belonging to the group consisting of ethyl alcohol and a non-toxic glycol, and an extract of gentian and ascorbic acid as solutes.

2. A composition for intensifying the flavor of foods and beverages, which consists essentially of a non-toxic solution having propylene glycol as the solvent, and an extract of gentian and ascorbic acid as solutes.

3. A composition for intensifying the flavor of foods and beverages, which consists essentially of a non-toxic solution containing extract gentian about 4 grams, ascorbic acid about 100 milligrams, as solutes, and as the solvent a lower aliphatic alcohol belonging to the group consisting of ethyl alcohol and a non-toxic glycol in an amount to make about 50 grams.

4. A composition for intensifying the flavor of foods and beverages, which consists essentially of a non-toxic solution containing extract gentian about 4 grams, ascorbic acid about 100 milligrams, as solutes, and as the solvent a lower aliphatic alcohol belonging to the group consisting of ethyl alcohol and propylene glycol in an amount to make about 50 grams.

WALT PHILLIPS.

REFERENCES CITED

The following references are of record in the file of this patent:

UNITED STATES PATENTS

| Number | Name | Date |
|---|---|---|
| 87,169 | Haubert et al. | Feb. 23, 1869 |
| 2,149,682 | Jorgensen | Mar. 7, 1939 |
| 2,283,589 | Stuart | May 19, 1942 |
| 2,435,744 | Hartman | Feb. 10, 1948 |